United States Patent
Oberg

[11] Patent Number: 5,431,032
[45] Date of Patent: Jul. 11, 1995

[54] WATER SAVING WASHER

[76] Inventor: Donald F. Oberg, 309 S. Linwood Beach, Linwood, Mich. 48634

[21] Appl. No.: 252,212

[22] Filed: Jun. 1, 1994

[51] Int. Cl.$^6$ .............................................. D06F 39/08
[52] U.S. Cl. ........................................ 68/207; 68/208; 68/902
[58] Field of Search ................. 68/902, 16, 18 R, 207, 68/208, 12.12

[56] References Cited

U.S. PATENT DOCUMENTS

| | | | |
|---|---|---|---|
| 639,844 | 12/1899 | Brown | 68/207 X |
| 1,631,266 | 6/1927 | Hasha | 68/902 X |
| 2,126,365 | 8/1938 | Alexopoulos | 68/208 X |
| 2,701,956 | 2/1955 | Duquenne | 68/16 |
| 5,285,665 | 2/1994 | Hetrick, Jr. | 68/902 X |
| 5,307,650 | 5/1994 | Mertz | 68/902 X |
| 5,345,637 | 9/1994 | Pastryk et al. | 68/207 X |

FOREIGN PATENT DOCUMENTS

| | | | |
|---|---|---|---|
| 634098 | 2/1962 | Italy | 68/207 |
| 7808214 | 2/1980 | Netherlands | 68/902 |

*Primary Examiner*—Philip R. Coe
*Attorney, Agent, or Firm*—Merlin B. Davey

[57] ABSTRACT

This invention provides a front-loaded washer comprising a top panel and a washer tub adapted to rotate on a horizontal axis, wherein at least a portion of the top panel of the washer comprises a tank, the tank being adapted for storing water from a desired rinse cycle and returning the stored water to the tub for use in a wash cycle.

2 Claims, 1 Drawing Sheet

WATER SAVING WASHER

BACKGROUND OF THE INVENTION

This invention relates to automatic washers, and, more particularly, relates to front-loading automatic washers having means for reducing the use of water.

DESCRIPTION OF THE PRIOR ART

The use of automatic washers having a suds-saving mode of operation is well known in the art. See, for example, U.S. Pat. No. 3,695,291. Other patents, such as, for example, U.S. Pat. Nos. 5,100,540 and 2,441,340 describe complex water saving systems requiring substantial and complicated mechanisms and controls inside the washing machine and have problems involving the storage of water for re-use. None of the known systems describe a front-loaded washing machine having a water recycling capability. It is well known in the art that front-loading washers save water and use less energy than top loaders, some estimates running as high as a $1500 saving in water, detergent and energy costs over a washer life time. However, front-loaded washers pose a special problem for water recycling as the tub is quite large and leaves no room for water storage tanks underneath or on the sides of the tub.

SUMMARY OF THE INVENTION

This invention provides a water saving front-loaded washer comprising a washer tub adapted to rotate on a horizontal axis, means for causing said tub to rotate, means for supplying water to said tub for wash and rinse cycles, means for removing water from said tub, valve means for controlling water intake and removal, means for storing water from at least one rinse cycle, means for returning said stored water to said tub for use in a wash cycle and timing means to program and control the desired sequence of washing, rinsing and storing rinse water for future use.

DETAILED DESCRIPTION OF THE DRAWING AND INVENTION

Figure 1:
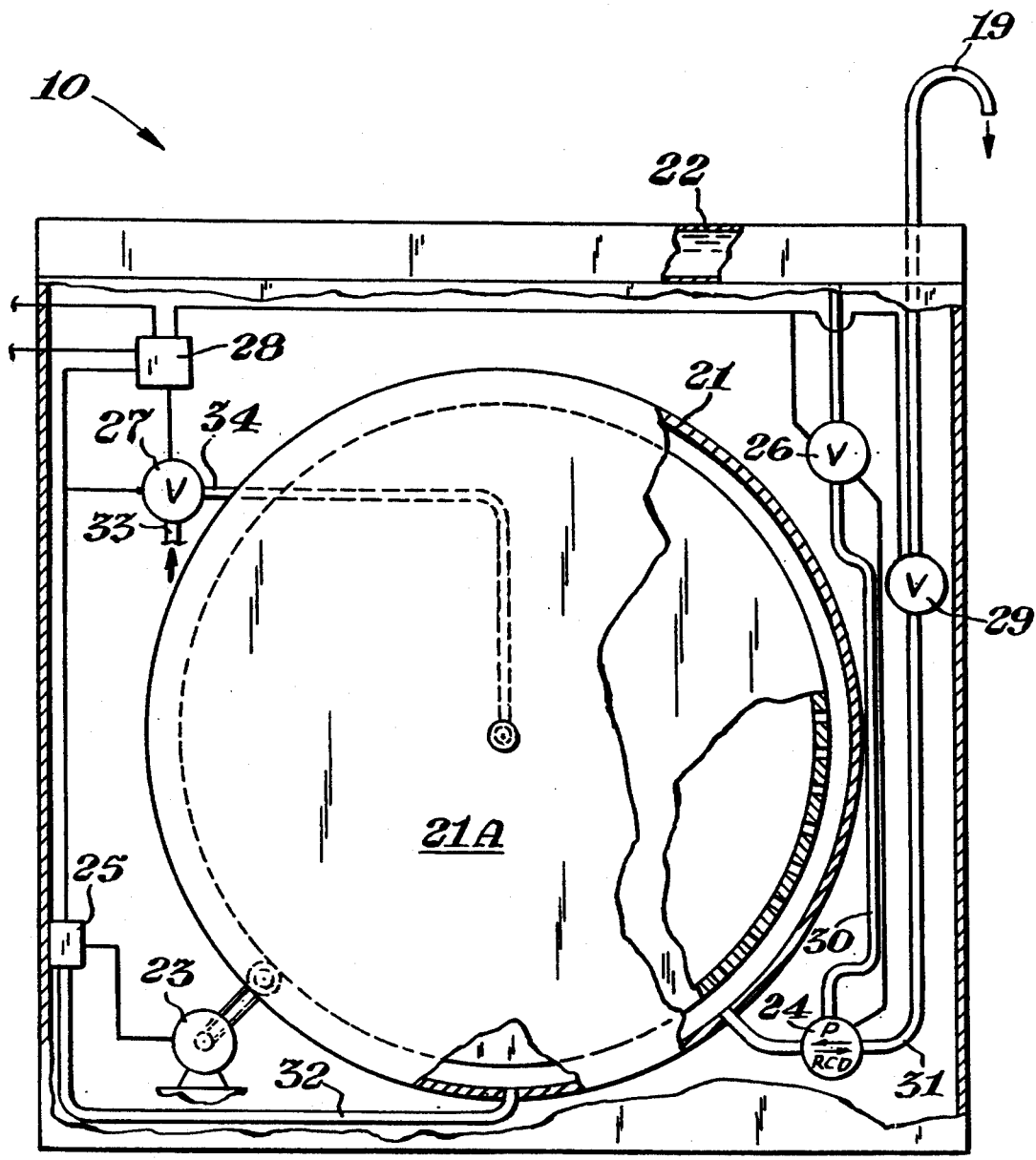

The invention will be further understood by the accompanying drawing wherein FIG. 1 is a schematic illustration of a water saving front-loaded washer 10 in accordance with one embodiment of the present invention.

In FIG. 1, 21 represents the outside drum of a front-loaded washer tub 21A. Tub 21A is caused to rotate by motor 23 which is controlled by timer 28 and water level control switch 25. Water pressure (level) in tub 21A is transmitted to switch 25 via water line 32. Switch 25 also controls water intake valve 27, through which water from intake line 33 is passed into tub 21A and drum 21 via water line 34, and is, in turn, controlled by timer 28. Timer 28 also controls reversible drain pump 24 and valves 26 and 29, which, respectively direct the delivery of rinse water to tank 22 or drain 19 via water lines 30 and 31. Tank 22 also serves as the top panel of washer 10. In operation of the washer of this invention, the first rinse of about 4 gallons is controlled by timer 28 through switch 25 and the rinse water is generally discarded through water line 31 and drain 19 by the closure of valve 26 and opening valve 29. Water from the second rinse cycle, also controlled by timer 28 through switch 25, and amounting to about 6 gallons, is pumped into tank 22 via water line 30 with valve 26 being open and valve 29 being closed and can be returned to tub 21 by gravity feed or by reversible pump 24 for use in washing a further load of clothing when desired, thereby using the full amount of the rinse water saved for a dual purpose.

With the tank for saving rinse water positioned at the top of the washer a flat working surface is provided as an added benefit.

The water saving front-loaded washer of this invention will wash and rinse a load of clothing on as little as 10 gallons of water, thereby providing savings in water, detergent and energy.

Various modifications may be made in the present invention without departing from the spirit or scope thereof as will be apparent to those skilled in the art.

I claim:

1. In a front-loaded washer comprising a top panel and a washer tub adapted to rotate on a horizontal axis, means to cause said tub to rotate, means to supply water to said tub for wash and rinse cycles and means for removing water from said tub, the improvement comprising a tank forming at least a portion of the top panel of said washer, said tank being adapted for storing water from a desired rinse cycle and means for returning said stored water to said tub in a wash cycle, said washer further comprising means for providing a first rinse cycle and a second rinse cycle, means for selectively controlling the amount of water in each rinse cycle such that more water is employed in said second rinse cycle than in said first rinse cycle and means for selective disposal of water from each rinse cycle.

2. Washer of claim 1 having means for selectively directing rinse water from said second rinse cycle into said tank and returning said rinse water to said washer tub for use in washing a following load.

* * * * *